United States Patent
Shibuya et al.

(10) Patent No.: US 11,178,312 B2
(45) Date of Patent: Nov. 16, 2021

(54) IMAGE FORMING APPARATUS, CONTROL METHOD, AND STORAGE MEDIUM FOR IMPROVING THROUGHPUT IN AN ELECTROPHOTOGRAPHIC IMAGE FORMING APPARATUS

(71) Applicant: CANON KABUSHIKI KAISHA, Tokyo (JP)

(72) Inventors: Yuichiro Shibuya, Abiko (JP); Jun Itoh, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 16/449,713

(22) Filed: Jun. 24, 2019

(65) Prior Publication Data
US 2020/0007697 A1 Jan. 2, 2020

(30) Foreign Application Priority Data

Jun. 27, 2018 (JP) .............................. JP2018-121966

(51) Int. Cl.
*H04N 1/64* (2006.01)
*G03G 15/20* (2006.01)
*H04N 1/00* (2006.01)

(52) U.S. Cl.
CPC ......... *H04N 1/648* (2013.01); *G03G 15/2039* (2013.01); *H04N 1/00188* (2013.01); *H04N 1/00222* (2013.01)

(58) Field of Classification Search
CPC combination set(s) only.
See application file for complete search history.

(56) References Cited

U.S. PATENT DOCUMENTS 6,154,493 A * 11/2000 Acharya .............. H04N 19/186
375/240.19
8,675,245 B2 3/2014 Itoh

FOREIGN PATENT DOCUMENTS

JP  2014-056036 * 3/2014
JP  2017194629 A 10/2017

* cited by examiner

*Primary Examiner* — Barbara D Reinier
(74) *Attorney, Agent, or Firm* — Carter, DeLuca & Farrell LLP (57) ABSTRACT

An object is to appropriately control a fixing process while making an attempt to increase speed by improving the PPM in an electrophotographic image forming apparatus. In the electrophotographic image forming apparatus, the control unit decompresses compressed quantized raster image data in units of pages. Then, the control unit derives an image feature quantity from decompressed raster image data in units of pages and notifies the printing unit of the derived image feature quantity. Then, the control unit transfers the decompressed raster image data to the printing unit in units of pages in response to an image transfer request from the printing unit. The printing unit sets a parameter relating to a fixing process in the printing processing based on the notified image feature quantity. Then, the printing unit performs the printing processing in accordance with the set parameter for the decompressed raster image data received from the control unit.

13 Claims, 10 Drawing Sheets

IMAGE FORMING APPARATUS, CONTROL METHOD, AND STORAGE MEDIUM FOR IMPROVING THROUGHPUT IN AN ELECTROPHOTOGRAPHIC IMAGE FORMING APPARATUS

BACKGROUND OF THE INVENTION

Field of the Invention

The present invention relates to an image processing technique for improving throughput in an electrophotographic image forming apparatus.

Description of the Related Art

In recent years, for OA devices, such as a printer and a copy machine, the market demand is increasing for a further increase in speed as well as energy saving. In image formation by the electrophotographic method, toner is melted by applying heat and a toner image is fixed onto a printing sheet by applying pressure. Normally, in order to obtain stable fixing properties, print parameters, such as the fixing temperature and the interval between sheets at the time of sheet conveyance, are set by taking into consideration the maximum color material amount (hereinafter, called "toner application amount") that can be applied on a printing sheet and the fixing process is controlled. In order to satisfy the market demand described above in the electrophotographic image forming apparatus such as this, an image analysis for appropriately setting the above-described print parameters and an increase in efficiency of data transfer to a printer engine become important.

Regarding this point, as a technique related to the fixing temperature control aiming at an increase in speed, for example, there is Japanese Patent Laid-Open No. 2017-194629. In the technique of Japanese Patent Laid-Open No. 2017-194629, processing to decompress a compressed raster image is performed for an image analysis separately from for image transfer and for the top N pages of a print job, the fixing temperature is controlled to a predetermined temperature, not based on the image analysis and thus a reduction in FPOT is suppressed. The FPOT is an abbreviation of First Print Output Time and indicates a time from the time print instructions are given until the first page is output.

From the point of view of an increase in speed, not only the FPOT but also PPM is important. The PPM is an abbreviation of Paper Per Minute and indicates the number of sheets that can be printed per minute, so-called throughput. For example, in a case where an input print job includes a large amount of page data, it can be said that a reduction in the time until the output of the last page is completed is more important than a reduction in the time until the first page is output after print instructions are given. Improvement of the PPM is indispensable to implement a reduction in the time until the output of the last page is completed, but by the method of Japanese Patent Laid-Open No. 2017-194629 described above, in which the processing to decompress a compressed raster image is performed separately for image transfer and for image analysis, it is not possible to improve the PPM significantly.

Consequently, an object of the present invention is to appropriately control a fixing process while making an attempt to increase speed by improving the PPM in an electrophotographic image forming apparatus.

SUMMARY OF THE INVENTION

The image forming apparatus according to the present invention includes: a printing unit configured to perform printing processing by an electrophotographic method; and a control unit configured to control the printing unit, and the control unit: decompresses compressed quantized raster image data in units of pages; derives an image feature quantity from decompressed raster image data in units of pages; notifies the printing unit of the derived image feature quantity; and transfers the decompressed raster image data to the printing unit in units of pages in response to an image transfer request from the printing unit, and the printing unit: sets a parameter relating to a fixing process in the printing processing based on the notified image feature quantity; and performs the printing processing in accordance with the set parameter for the decompressed raster image data received from the control unit.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment (System Configuration)

Figure 1:
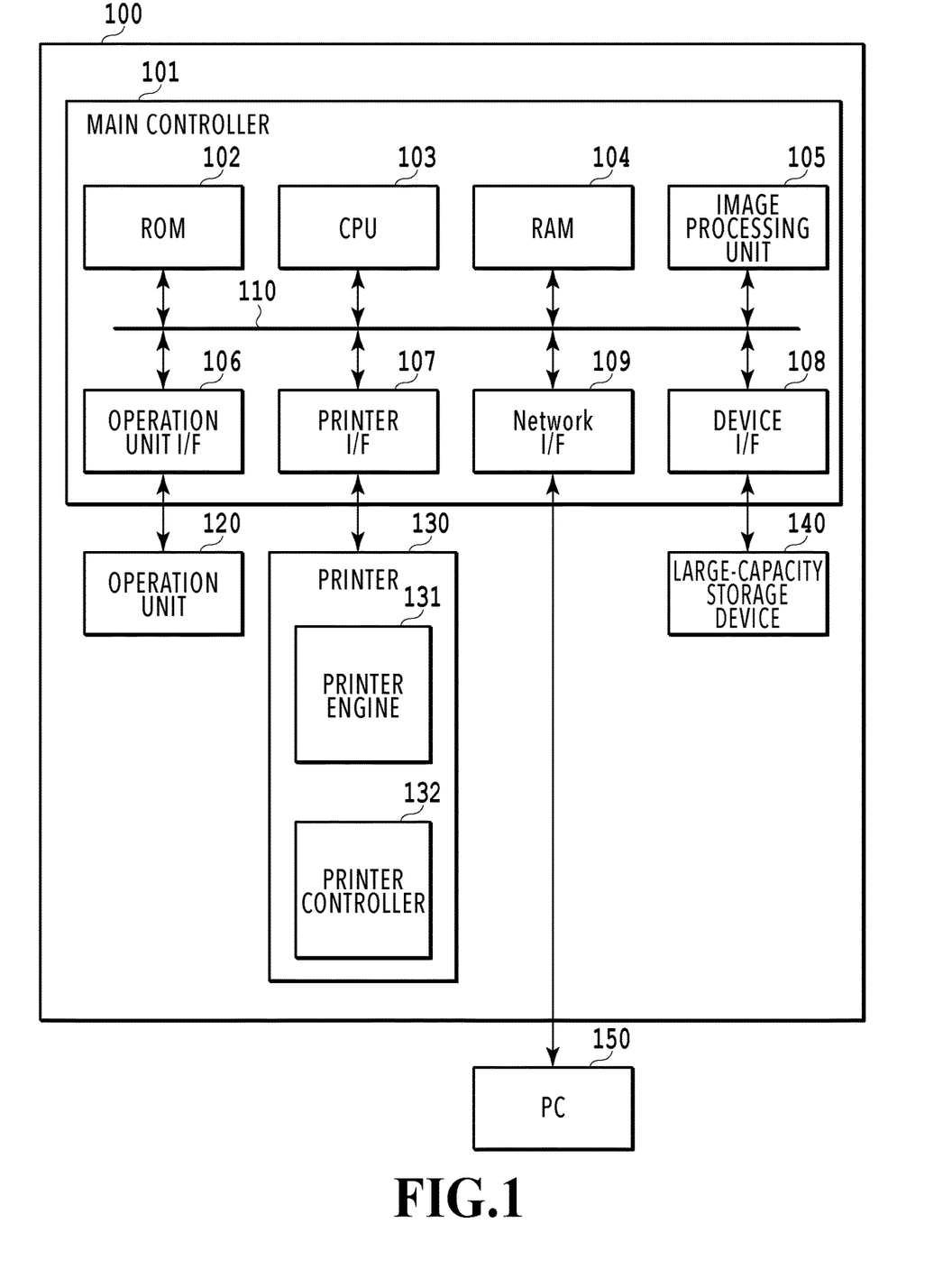
FIG. 1 is a diagram showing a system configuration of an image forming apparatus.

FIG. 1 is a diagram showing a system configuration of an image forming apparatus according to the present embodiment. An image forming apparatus 100 is, for example, a color or monochrome image forming apparatus having one or a plurality of functions as a copy machine, a printer, and a facsimile machine and forming an image on a printing medium by an electrophotographic method. The image forming apparatus 100 includes a main controller 101 and, an operation unit 120, a printer 130, and a large-capacity storage device 140 connected with the main controller 101 via various I/Fs (interfaces) 106 to 108. Further, the image forming apparatus 100 is connected with a PC 150, which is an external device, via a network I/F 109.

The main controller 101 is a main control unit including a ROM 102, a CPU 103, a RAM 104, and an image processing unit 105 and these units and the above-described various I/Fs 106 to 109 are connected by a system bus 110. The CPU 103 is a processor that controls the entire image forming apparatus 100 and performs operation processing and the like and performs each piece of processing, to be described later, based on programs stored in the ROM 102. The ROM 102 stores a boot program, various control programs, character data, character code information, and the like. The RAM 104 is a main storage device that is made use of as a work memory in a case where a program for each of a variety of pieces of processing is performed or as a storage area of various kinds of image data. The image processing unit 105 performs predetermined image processing for image data relating to a print job input from the PC 150. Details of the image processing unit 105 will be described later.

The operation unit 120 includes, for example, a touch panel liquid crystal display an displays the setting state of the device, the current processing inside the device, the error state, and the like and at the same time, a user changes the print settings and gives instructions to perform reset and the like. The printer 130 includes a printer engine 131 and a printer controller 132 that controls the printer engine 131. The printer engine 131 includes modules, such as an image forming mechanism, a sheet conveyance mechanism, and a fixing mechanism. In the image forming mechanism, a toner image is formed on a transfer belt in accordance with image data supplied from the printer I/F 107 and a sheet is conveyed to the position of the toner image on the transfer belt by the sheet conveyance mechanism. Then, an image is formed on the sheet by heating the toner transferred onto the sheet at a predetermined temperature and applying pressure to fix the toner in the fixing mechanism. The printer controller 132 includes a CPU, a ROM, a RAM, and the like and performs operation control of the print engine 131 based on instructions of the main controller 101. The large-capacity storage device 140 is, for example, an HDD and an SSD, and is an auxiliary storage device that is made use of for spooling image data, storing programs, each information file, and the like.

In the present embodiment, the main controller 101 performs processing to derive an image feature quantity in units of pages for image data generated by the image processing unit 105 and for which predetermined image processing has been performed. Here, as the image feature quantity, for example, mention is made of a toner application amount on each page, an average print ratio, a coverage, and the like.

Figure 2:
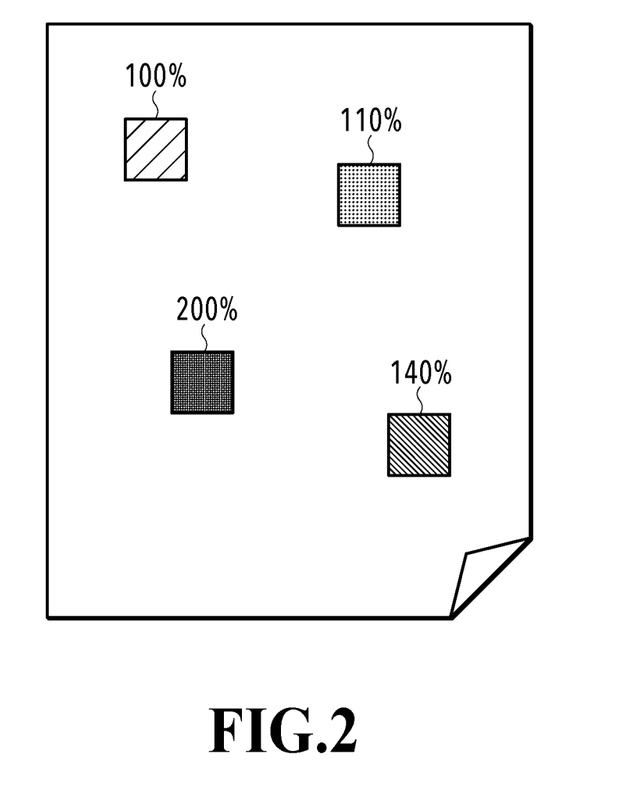
FIG. 2 is a diagram explaining a toner application amount.

FIG. 2 is a diagram explaining a toner application amount. The image feature quantity in an area determined in advance within a page is found by the CPU 103 and the printer controller 132 of the printer 130 is notified of the image feature quantity. FIG. 2 shows the toner application amounts in pixels on a certain page. The toner application amount having the maximum value within the page of the toner application amounts of objects whose size is larger than or equal to a predetermined size is taken to be the maximum toner application amount and the quotient obtained by dividing the sum of the toner application amount of each pixel by the total number of pixels is taken to be the average print ratio. Further, the quotient obtained by dividing the sum of the pixels whose toner application amount is 0 (white) by the total number of pixels is taken to be the coverage. Then, the printer controller 132 performs temperature control at the time of fixing a toner image onto a sheet, inter-sheet control at the time of sheet conveyance, and the like based on the notified image feature amount.

(Configuration of Image Processing Unit)

Figure 3:
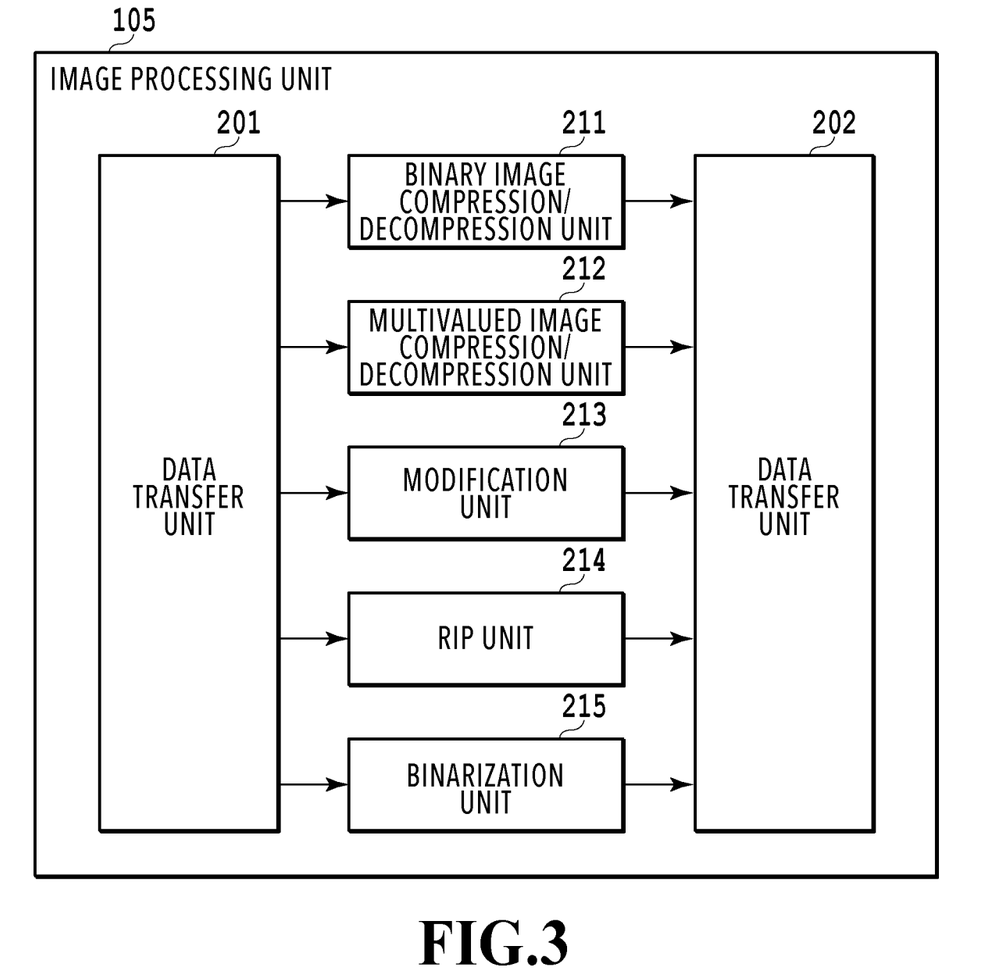
FIG. 3 is a block diagram showing an internal configuration of an image processing unit.

FIG. 3 is a block diagram showing the internal configuration of the image processing unit 105. The image processing unit 105 includes data transfer units 201 and 202, a binary image compression/decompression unit 211, a multivalued image compression/decompression unit 212, a modification unit 213, a RIP unit 214, and a binarization unit 215. In the following, each unit is explained.

The data transfer unit 201 acquires image data from predetermined hardware via the system bus 111 by, for example, DMA (Direct Memory Access). Then, the data transfer unit 201 outputs the acquired image data to the binary image compression/decompression unit 211, the multivalued image compression/decompression unit 212, the modification unit 213, the RIP unit 214, and the binarization unit 215. Further, the data transfer unit 202 outputs image data acquired from the binary image compression/decompression unit 211, the multivalued image compression/decompression unit 212, the modification unit 213, the RIP unit 214, and the binarization unit 215 to predetermined hardware via the system bus 111.

The binary image compression/decompression unit 211 performs compression processing for raster image data whose each pixel value is quantized from a multi-value (for example, eight bits) into a binary value (one bit) by, for example, the JBIG method in the binarization unit 215. Further, the binary image compression/decompression unit 211 performs decompression processing for compressed binary raster image data already compressed by the JBIG method.

The multivalued image compression/decompression unit 212 performs compression processing for multivalued raster image data by, for example, the JPEG method. Further, the multivalued image compression/decompression unit 212 performs decompression processing for compressed multi-valued raster image data already compressed by the JPEG method The modification unit 213 performs a variety of pieces image modification processing, such as rotation, movement, scaling (enlargement/reduction), and combination, for raster image data.

The RIP unit 214 generates raster image data represented in the bitmap format by performing rendering processing for intermediate data generated by the CPU 103 interpreting PDL data.

The binarization unit 215 generates binary raster image data whose each pixel value is represented by one bit, that is, 0 or 1 by performing quantization processing for raster image data whose each pixel value is represented by a multi-value (for example, eight bits). The quantized value is not limited to a binary value and may be a quaternary value or a hexadecimal value. In this case, it is needless to say that the above-described binary image compression/decompression unit 211 is a processing unit compatible with the quantized value.

(Configuration of Printer)

Figure 4:
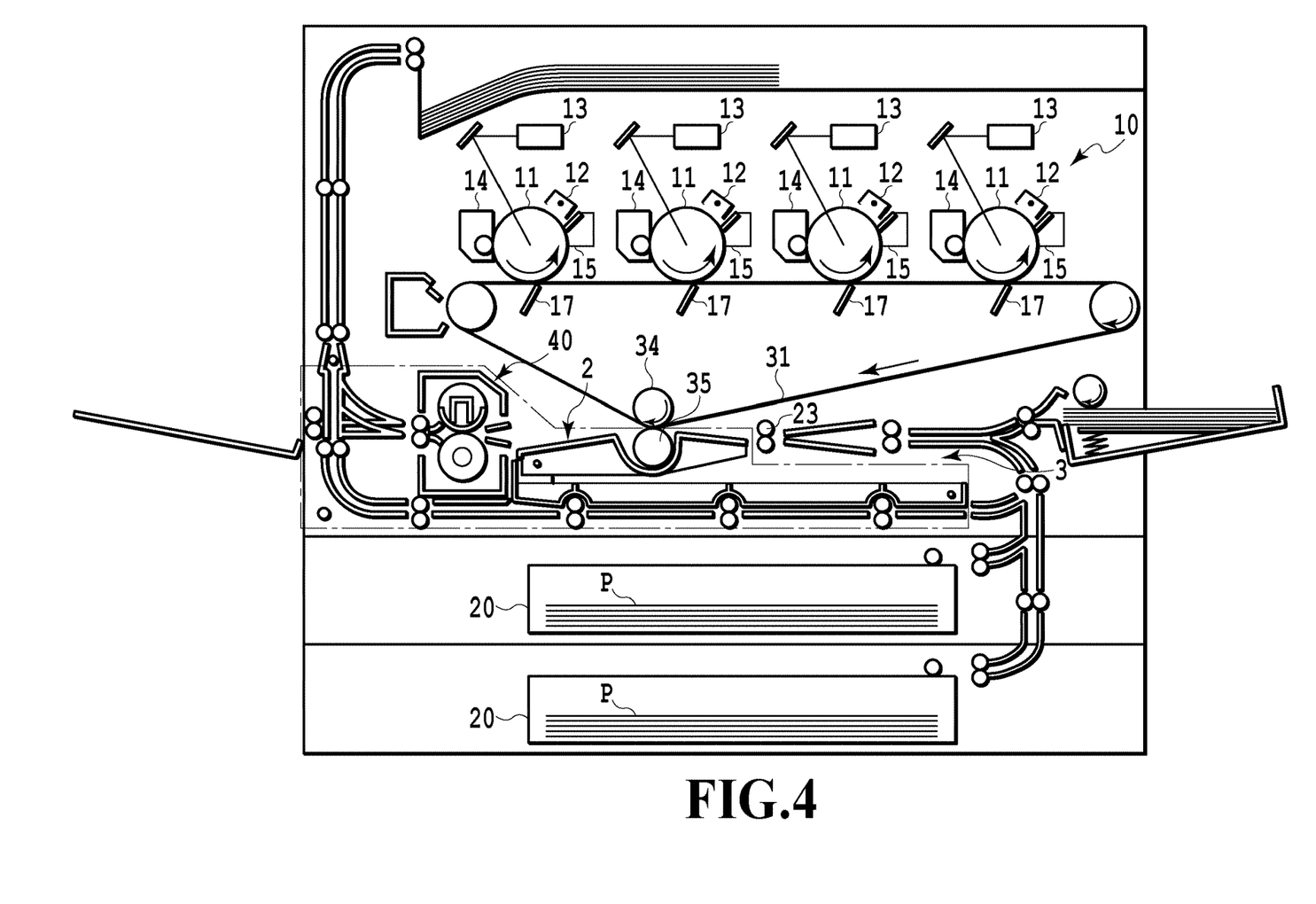
FIG. 4 is a section diagram of a printer engine.

FIG. 4 is a section diagram of the printer engine 131. The printer engine 131 includes an image forming unit 10 configured to form a toner image of each color of Y (yellow), M (magenta), C (cyan), and Bk (black). The image forming unit 10 includes four photoconductor drums 11 (11Y, 11M, 11C, 11Bk) corresponding to each color of Y, M, C, and Bk in order from left. In the following, the most basic image forming operation is explained.

Each photoconductor drum 11 is driven to rotate in the arrow direction (in the counterclockwise direction in FIG. 4) by a drive source. Around each photoconductor drum 11, an electrifier 12, a laser scanner unit 13, a developing device 14, a primary transfer blade 17, and a cleaner 15 are arranged in order along the rotation direction.

The surface of the photoconductor drum 11 is electrified in advance by the electrifier 12. After this, the photoconductor drum 11 is exposed by the laser scanner unit 13 irradiating laser light in accordance with image information and forms an electrostatic latent image. The electrostatic latent image is turned into a toner image of each color of YMCBk by the developing device 14 and primarily transferred sequentially onto an intermediate transfer belt 31 by the primary transfer blade 17. After the primary transfer, the toner that remains on the photoconductor drum 11 is removed by the cleaner 15. In this manner, the surface of the photoconductor drum 11 becomes clean and enters a state where next image formation is possible.

Sheets P placed on a feed cassette 20 or a multi-feed tray 25 are sent out one by one by a feed mechanism and sent into a registration roller pair 23. The registration roller pair 23 temporarily stops the sheet P and in a case where the sheet P is skewed with respect to the conveyance direction, corrects the orientation of the sheet P. The registration roller pair 23 sends the sheet P into between the intermediate transfer belt 31 and a secondary transfer roller 35 in synchronization with the toner image on the intermediate transfer belt 31. The roller 35 transfers the toner image of each color of YMCBk on the belt 31 onto the sheet P. After this, the sheet P is sent toward a fixing device 40. The fixing device 40 applies heat and pressure to the toner image on the sheet P and fixes the toner image onto the sheet P. The sheet P that comes out of the fixing device 40 is sent onto a discharge tray by a discharge roller through the conveyance path.

(Fixing Temperature Adjustment Control)

Next, adjustment control of the fixing temperature necessary for fixing of a toner image on each page in accordance with the toner application amount in units of detected pages is explained. In order to fix toner onto a sheet without causing defective fixing, it is necessary to set the temperature of the fixing device 40 to a temperature at which it is possible to securely fix the maximum toner application amount on a processing-target page. At this time, the maximum toner application amount differs depending on the printing-target image data, and therefore, the approximate fixing temperature also differs for each piece of image data. Then, the larger the maximum toner application amount is, the higher the necessary fixing temperature is.

Figure 5A:
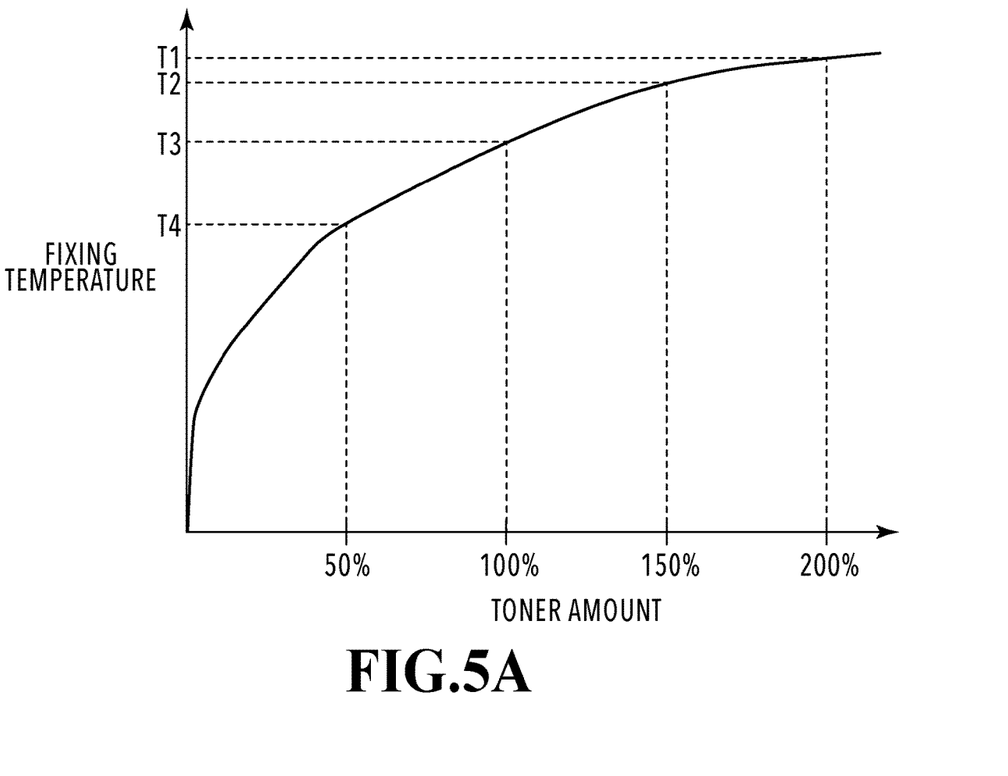
FIG. 5A is an example of a graph representing a relationship between the toner application amount and the fixing temperature and FIG. 5B is an example of a table obtained by normalizing the relationship between the toner application amount and the fixing temperature.

FIG. 5A is an example of a graph representing a relationship between the toner application amount and the fixing temperature and the horizontal axis represents the toner application amount and the vertical axis represents the temperature necessary for toner fixing. In FIG. 5A, for example, in a case where the toner application amount is 200%, the lowest temperature necessary for toner fixing is T1. Similarly, in a case where the toner application amounts are 150%, 100%, and 50%, the lowest temperatures necessary for toner fixing are T2, T3, and T4, respectively. In a case where the temperature of the fixing device 40 has risen to the temperature at which it is possible to fix the maximum toner application amount in the printing-target image data, the problem of the defective fixing of toner does not occur. Because of this, the lowest temperature necessary for toner fixing is found from the toner application amount in units of detected pages and the temperature of the fixing device 40 is controlled so that the found lowest temperature is implemented. Incidentally, it takes a predetermined time for the temperature of the fixing device 40 to reach a desired set temperature. Because of this, control is performed by determining the fixing temperature that is applied to the page of interest after performing an image analysis for the pages that follow, in addition to the page of interest. For example, the fixing temperature is controlled so that the lowest temperature necessary for the processing-target page is guaranteed by calculating the toner application amount of each page by performing an image analysis for the processing-target page and the two pages that follow and by taking into consideration the temperature required for the subsequent pages.

Figure 5B:
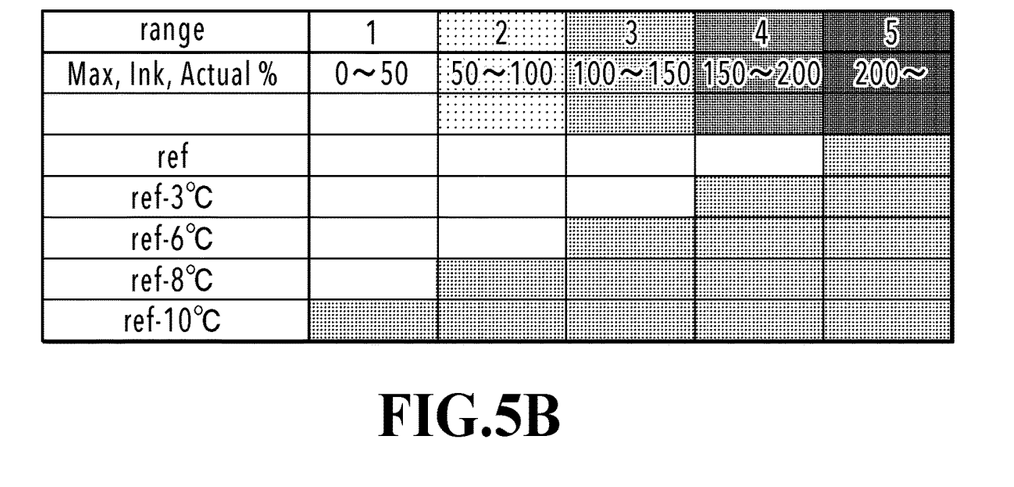

FIG. 5B shows an example of a table obtained by normalizing the relationship between the toner application amount and the fixing temperature. In the table in FIG. 5B, for example, in a case where the toner application amount is 200% or more, the lowest temperature necessary for tone fixing is the highest reference temperature (ref). On the other hand, in a case where the toner application amount is 50% or less, the lowest temperature necessary for toner fixing is a temperature 10 degrees lower than the reference temperature (ref) (ref −10°). By creating in advance the table such as this and by referring to the table at the time of fixing temperature control, it is possible to determine the fixing temperature corresponding to the detected toner application amount.

Here, the fixing temperature adjustment control is explained, and the way of thinking is the same in a case of inter-sheet control at the time of sheet conveyance. That is, in order to fix toner onto a sheet without causing defective fixing, it is sufficient to set the interval between sheets so that the larger the maximum toner application amount is, the wider the interval between sheets is. At this time, a table for inter-sheet control like that in FIG. 5B is prepared in advance and inter-sheet control is performed by referring to the table.

(Printing Processing)

Figure 6:
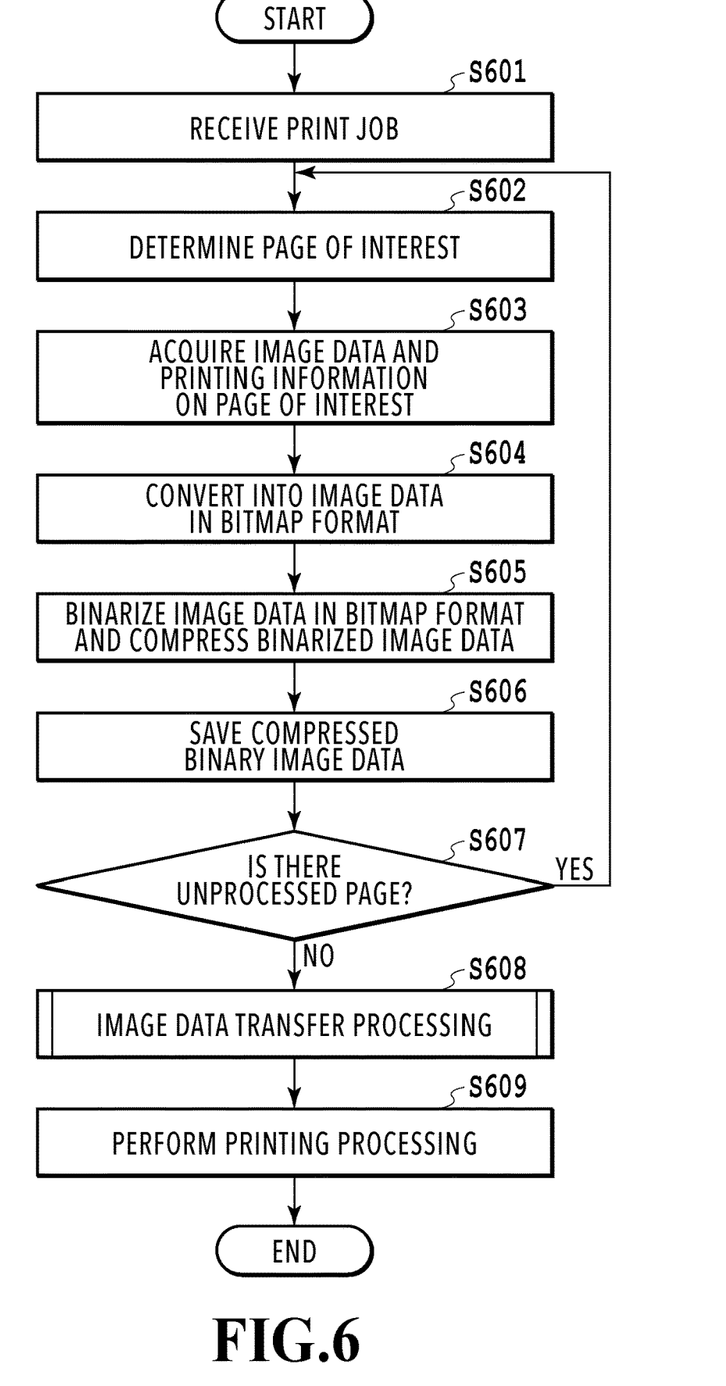
FIG. 6 is a flowchart showing a flow of entire printing processing.

FIG. 6 is a flowchart showing a flow of entire printing processing in the image forming apparatus 100. Here, explanation is given by taking printing processing in accordance with a print job input via the network I/F 109 as an example. However, the printing processing is not limited to this. For example, in a case where the image forming apparatus 100 is a so-called MFP (Multi Function Printer), it is also possible to apply to printing processing, such as outputting image data received by a facsimile machine and outputting image data obtained by reading a document by the image reading unit (copy processing). It is assumed that the flow shown in FIG. 6 is implemented by the CPU 103 of the main controller 101 loading a program stored in the ROM 102 or the large-capacity storage device 140 onto the RAM 104 and executing the program. In the following explanation, symbol "S" indicates a step.

At S601, a print job from the PC 150 is input via the network I/F 109. In the print job, header information indicating the number of pages, printing conditions, such as color and monochrome, is included, in addition to PDL data in units of pages. Here, the following explanation is given on the assumption that PDL data corresponding to a total of five pages is included in the print job. The PDL data corresponding to five pages and the printing information, which are acquired, are stored in the large-capacity storage device 140.

At S602, a processing-target page of interest is determined from the input image data saved in the large-capacity storage device 140. In a case where the input image data consists of a total of five pages, the page of interest is determined in order from the first page. At S603 that follows, image data and printing information on the determined page of interest are read from the large-capacity storage device 140 and stored in the RAM 104.

In a case where the image format of the page of interest is not the bitmap format, at S604, the image processing unit 105 is instructed to convert the image format of the page of interest into the bitmap format. Upon receipt of the instructions, the image processing unit 105 generates image data in the bitmap format by performing image processing in accordance with input image data. Here, the input image data is PDL data, and therefore, the CPU 103 generates intermediate data by interpreting the PDL and the RIP unit 214 performs rendering for the intermediate data, and thus the input image data is converted into bitmap data. Further, in a case where image data compressed by the JPEG method is input, depression processing is performed in the multivalued image compression/decompression unit 212. The multivalued raster image data thus obtained is stored in the RAM 104 via the data transfer unit 202.

At S605, the image processing unit 105 is instructed to binarize the multivalued raster image data stored in the RAM 104 and then compress the binarized raster image by the JBIG method. Upon receipt of the instructions, the image processing unit 105 reads the multivalued raster image data from the RAM 104 and the binarization unit 215 converts the multivalued raster image into binary raster image, and then the binary image compression/decompression unit 211 performs compression processing by the JBIG method. The compressed binary image data is stored in the RAM 104. At S606 the follows, the compressed quantized raster image data (compressed binary image data) stored in the RAM 104 is saved in the large-capacity storage device 140.

At S607, whether the processing is completed for all the pages of the input print job is determined. In a case where there is an unprocessed page, the processing returns to S602, and the next page is determined to be the page of interest and the processing is continued. On the other hand, in a case where all the pages are already processed, the processing advances to S608.

At S608, the compressed binary image data saved in the large-capacity storage device 140 is decompressed and sequentially transferred to the printer 130 in units of pages. At this time, the printer 130 is also notified of information on the image feature quantity in units of pages prior to the decompressed binary image data. This image data transfer processing will be described later. Then, at S609, in the printer 130, printing processing in accordance with the transferred decompressed binary image data is performed. At this time, the parameters relating to the fixing process at the time of performing printing processing for each page, specifically, the fixing temperature and the interval between sheets at the time of sheet conveyance are controlled based on information on the above-described image feature quantity.

The above is the flow of the printing processing according to the present embodiment. In the flow described above, the necessary conversion processing is performed in units of pages, but the conversion processing is not limited to this. For example, it may also be possible to perform conversion processing in units of colors or in units of bands. Further, in a case where N-Up printing is specified in the printing information, it is sufficient to perform processing to combine pages into a page layout in accordance with user specification in the modification unit 213 and to perform binarization or compression processing (S605) for each page after a plurality of pages is put together.

(Image Data Transfer Processing)

Figure 7:
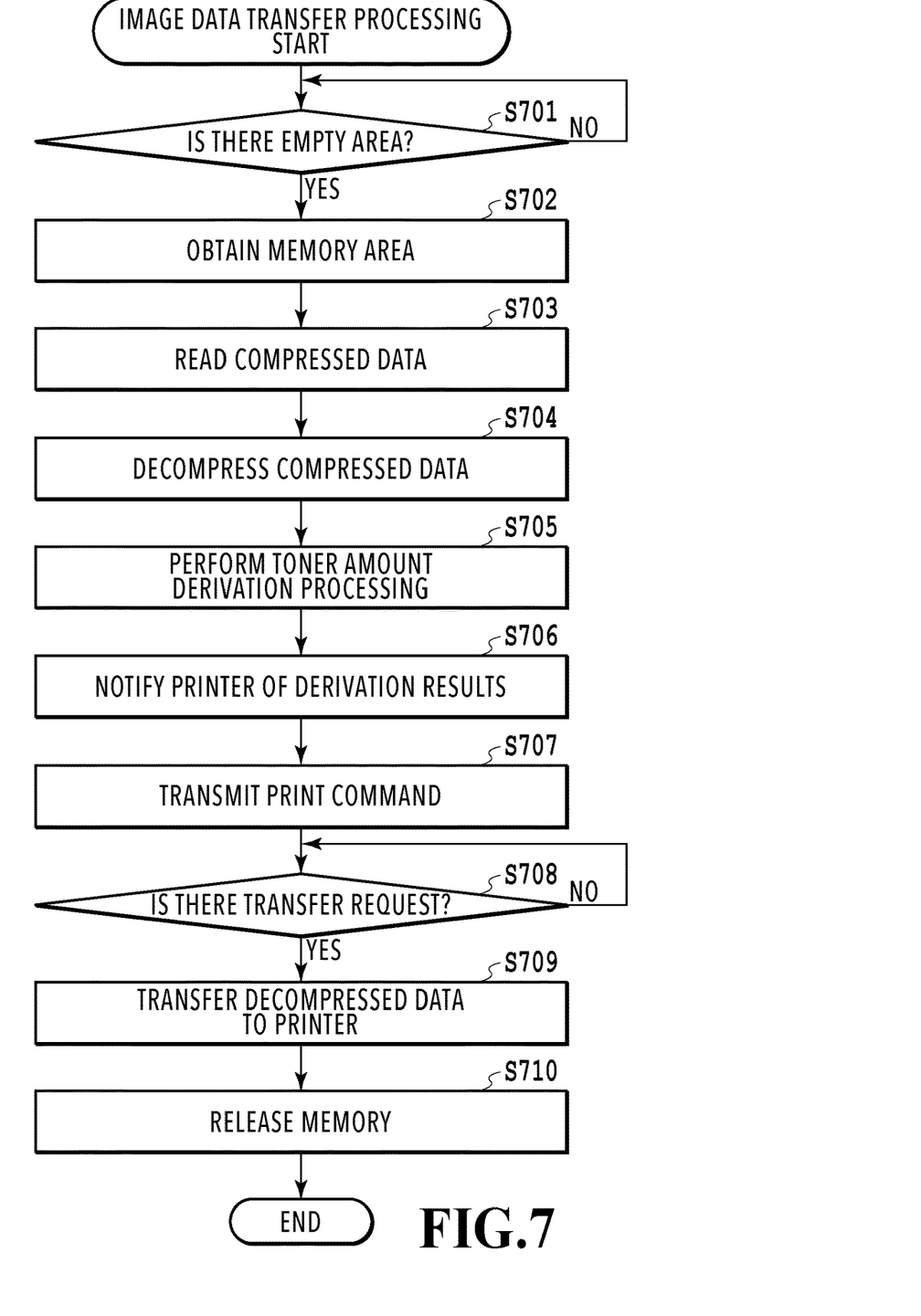
FIG. 7 is a flowchart showing details of image data transfer processing.

Following the above, the image data transfer processing (S608), which is a feature of the present embodiment, is explained in detail. FIG. 7 is a flowchart showing details of the image data transfer processing.

At S701, whether or not there is an empty area in a memory for transfer is checked. The memory for transfer has a memory capacity capable of simultaneous transfer processing of image data corresponding to a plurality of pages (for example, three pages) and is secured in advance, for example, on the RAM 104. Alternatively, the memory for transfer may be a dedicated memory for data transfer provided separately from the RAM 104. Information on data transfer-target page is managed by a page counter and the number of pages whose transfer processing is in progress is grasped. The initial value of the page counter is "0". By the value of this page counter, how many pages for which there is an empty area left in the memory for transfer are checked. In a case where the counter value reaches "3", it is determined that there is no empty area and the same determination processing is performed after a predetermined time elapses. That is, the standby state continues until there is an empty area. On the other hand, in a case where the count value does not reach "3", it is determined that there is an empty area and the processing advances to S702. It may also be possible to use information, such as a flag indicating whether or not there is an empty area in the memory for transfer, in place of the page counter.

At S702, a memory area to be used for transfer processing is obtained in accordance with the currently empty area. In the stage immediately after the start of this flow, it is possible to simultaneously obtain the memory area corresponding up to three pages at the maximum. Then, the count value corresponding to the obtained number of pages is set to the page counter. In a case where the memory area corresponding to a plurality of pages is obtained, the subsequent processing advances in parallel for a plurality of pages along the way, but for convenience of explanation, the processing for one page is explained in this flow. Then, how the parallel processing advances for a plurality of pages is explained by using a timing chart separately.

At S703, the compressed binary image data (hereinafter, simply called "compressed data") of a processing-target page is read from the large-capacity storage device 140 and stored in the RAM 104. At S704 that follows, the binary image compression/decompression unit 211 is instructed to decompress the compressed data of the processing-target page. Upon receipt of the instructions, the binary image compression/decompression unit 211 reads the compressed data of the processing-target page stored in the RAM 104 and performs decompression processing. The binary image data obtained by the decompression processing (hereinafter, simply called "decompressed data") is stored in the memory area within the RAM 104 obtained at S702 (or in a dedicated image memory) after being subjected appropriately to predetermined image processing, such as rotation, movement, scaling, and combination, in accordance with the printing information and user instructions via the operation unit 120.

At S705, processing to drive an image feature quantity is performed for the decompressed data of the processing-target page, for which predetermined image processing has been performed as needed. Here, explanation is given by taking a case as an example where a toner application amount is derived as the image feature quantity. For the derivation of the toner application amount in units of pages, it is sufficient to apply a publicly known technique, for example, the method described in Japanese Patent Laid-Open No. 2017-194629. In a case where, for example, an average print ratio is derived as the image feature quantity for example, it is sufficient to divide the simple sum of the density for each pixel of each color by the sum of the maximum density amount for each pixel of each color as indicated by equation below.

average print ratio=(toner application amount of first pixel+toner application amount of second pixel+ . . . +toner application amount of $N$th pixel)/$N$ (N: natural number not less than 1)

At S706, the printer 130 is notified of the toner application amount of the processing-target page, which is derived at S705, via the printer I/F 107. At S707 that follows, the printer 130 is instructed to print the processing-target page via the printer I/F 107 (transmission of print command). Then, at S708, the standby state for an image transfer request from the printer 130 is brought about. In a case where the CPU 103 receives an image transfer request from the printer 130, the processing advances to S709.

At S709, the decompressed data stored in the RAM 104 is transferred to the printer 130 via the printer I/F 107. Then, at S710, the memory area corresponding to the page whose data transfer is completed is released and the counter value of the page counter described above is decremented (1 is subtracted).

The above is the contents of the image data transfer processing.

(Parallel Processing of a Plurality of Pages)

Following the above, how image analysis and image transfer advance in a case where printing processing of a plurality of pages is performed continuously is explained by taking processing for the Nth page, (N+1)th page, and (N+2)th page as an example. Before explanation of the present embodiment is given, first, the conventional technique is reviewed.

Figure 8:
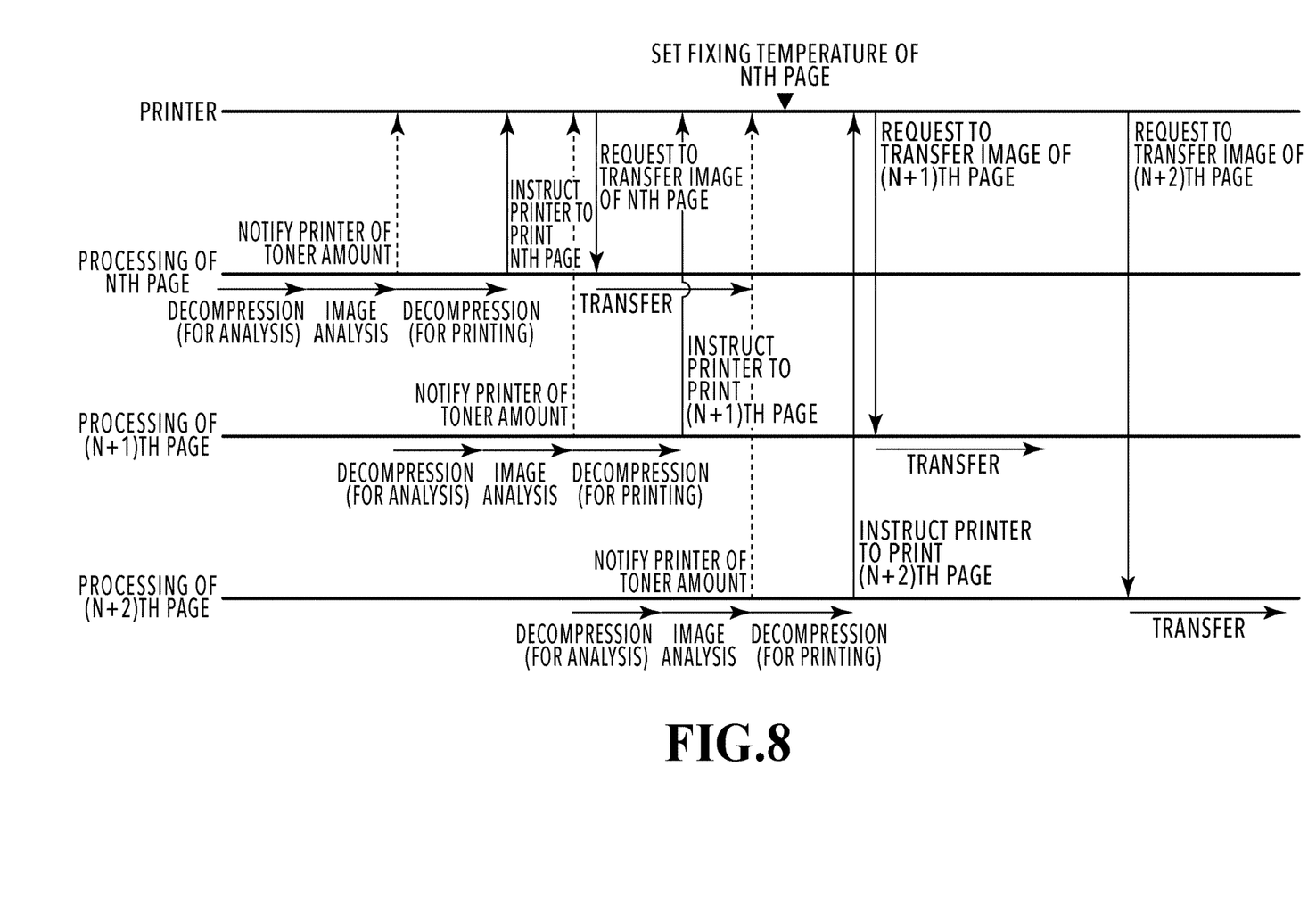
FIG. 8 is a timing chart showing progress of image analysis and image transfer in a conventional image forming apparatus.

FIG. 8 is a timing chart showing progress of image analysis and image transfer in a conventional image forming apparatus. For example, in a case of the conventional technique as in Japanese Patent Laid-Open No. 2017-194629, as described in paragraphs 5 and 6, the memory area for storing raster image data is prepared separately for image analysis and for printing (for data transfer). This is to make it possible to perform the image analysis of a plurality of pages prior to data transfer and in the following, explanation is given premised on the apparatus configuration such as this.

First, decompression processing for analysis is performed for the compressed data of the Nth page. For the decompressed data obtained by the decompression processing for analysis, the toner application amount is derived after the decompressed data is stored in the memory for analysis and the printer 130 is notified of the toner application amount of the Nth page, which is the derivation result. After the notification, decompression processing for printing is performed for the compressed data of the Nth page. The decompressed data of the Nth page, which is obtained by the decompression processing for printing, is stored in the memory for transfer and the print command of the Nth page is sent to the printer 130. Then, in response to an image transfer request from the printer 130, the decompressed data of the Nth page, which is stored in the memory for transfer, is transferred to the printer 130. In a case where attention is focused on the Nth page, the processing is that as described above and in parallel to part of the processing of the Nth page, processing of the (N+1)th page and the (N+2)th page is also advanced. At this time, control is performed so that the transfer of decompressed data of each page does not overlap the other transfer.

In the stage of completion of the image analysis of the Nth page (derivation of the toner application amount), the decompressed data of the Nth page stored in the memory for analysis is discarded and the memory for analysis is released. Then, the decompression processing for analysis for the compressed data of the (N+1)th page is performed in parallel to the decompression processing for printing of the Nth page. The decompressed data of the (N+1)th page obtained by the decompression processing for analysis is stored in the memory for analysis, the image analysis is performed for the decompressed data, and the printer 130 is notified of the toner application amount of the (N+1)th page. The same processing is performed also for the (N+2)th page. That is, in the stage of completion of the image analysis for the (N+1)th page, the memory for analysis is released. Then, the decompression processing for analysis for the compressed data of the (N+2)th page is performed in parallel to the decompression processing for printing for the compressed data of the (N+1)th page. Then, the image analysis is performed for the decompressed data obtained by the decompression processing for analysis for the (N+2)th page and the printer 130 is notified of the toner application amount of the (N+2)th page.

In a case where the CPU 103 notifies the printer 130 of the toner application amounts for the Nth page and the two pages that follow in this manner, in the printer 130, the fixing temperature for the Nth page is set based on each toner application amount of the Nth to (N+2)th pages by the printer controller 132. Here, the timing of setting of the fixing temperature is only required to be before the transfer start of the decompressed data of the next page. Then, although omitted in FIG. 8, for the (N+1)th page and the (N+2)th page similarly, the setting of the fixing temperature is performed respectively by taking into consideration the toner application amounts for the two pages that follow.

In the conventional technique described above, the time required for the decompression processing for image analysis is the bottleneck to an increase in speed. Further, there is such a problem that, in a case where the image processing path for image analysis is separated from that for printing, on a condition that modification processing, such as enlargement and combination, is performed in the image processing path for printing after image analysis, it is not possible to control the accurate fixing temperature.

Following the above, the progress of image analysis and image transfer according to the present embodiment is explained with reference to the timing chart in FIG. 9. In a case of the present embodiment, the image memory is not divided for image analysis and for printing and the decompression processing of compressed raster image data of each page is performed only once in the image processing path for printing. That is, the decompression processing for analysis and that for printing are not performed separately, unlike the above-described conventional technique. In the following, specific explanation is given.

First, decompression processing for the compressed data of the Nth page is performed. The obtained decompressed data is stored in the image memory and at the same time, image analysis (derivation of the toner application amount) is performed for the decompressed data. Then, in a case where the printer 130 is notified of the toner application amount of the Nth page, which is the derivation result, the print command of the Nth page is sent to the printer 130 following that. Then, in response to an image transfer request from the printer 130, the decompressed data of the Nth page stored in the image memory is transferred to the printer 130. In the stage of notification of the toner application amount of the Nth page, the decompressed data is not discarded but remains stored in the image memory and the decompressed data is discarded after transfer to the printer 130.

On the other hand, after the notification of the toner application amount of the Nth page, the decompression processing and the toner application amount derivation processing for the (N+1)th page are started and in a case where the printer 130 is notified of the derivation result, the print command of the (N+1)th page is sent to the printer 130 without delay. Then, in response to the image transfer request from the printer 130, the decompressed data of the (N+1)th page stored in the image memory is transferred to the printer 130. In the stage of notification of the toner application amount of the (N+1)th page, the decompressed data is not discarded but remains stored in the image memory and the decompressed data is discarded after transfer to the printer 130. The (N+2)th page is also processed similarly. That is, after the notification of the toner application amount of the (N+1)th page, the decompression processing and the toner application amount derivation processing for the (N+2)th page are started and in a case where the printer 130 is notified of the derivation result, the print command of the (N+2)th page is sent to the printer 130 without delay. Then, in response to the image transfer request from the printer 130, the decompressed data of the (N+2)th page stored in the image memory is transferred to the printer 130. In the stage of notification of the toner application amount of the (N+2)th page, the decompressed data is not discarded but remains stored in the image memory and the decompressed data is discarded after transfer to the printer 130. Control is performed so that the transfer of compressed data of each page does not overlap the other transfer and this is the same as in the conventional technique.

In a case where the notification of the toner application amounts for the Nth page and the two pages that follow is completed, in the printer 130, the fixing temperature for the Nth page is set by the printer controller 132 based on each toner application amount of the Nth to (N+2)th pages. In this example, the timing of setting of the fixing temperature is substantially the same as in the case of FIG. 8. Although omitted in FIG. 9, for the (N+1)th page and the (N+2)th page, the setting of the fixing temperature is also performed similarly based on the toner application amounts for the two pages that follow, respectively. As is obvious from a comparison with FIG. 8 described previously, the timing of instructions to print each page is earlier than that in the conventional technique, and therefore, this will contribute to improvement of the PPM although this also depends on the performance and the like of the printer engine 131. Further, the image analysis is performed within the image processing path for printing, and therefore, even in a case where various layouts, such as rotation and scaling, are changed, it is made possible to perform accurate fixing temperature adjustment control without causing a discrepancy between the image to be transferred and the image used for analysis.

Modification Example

Figure 9:
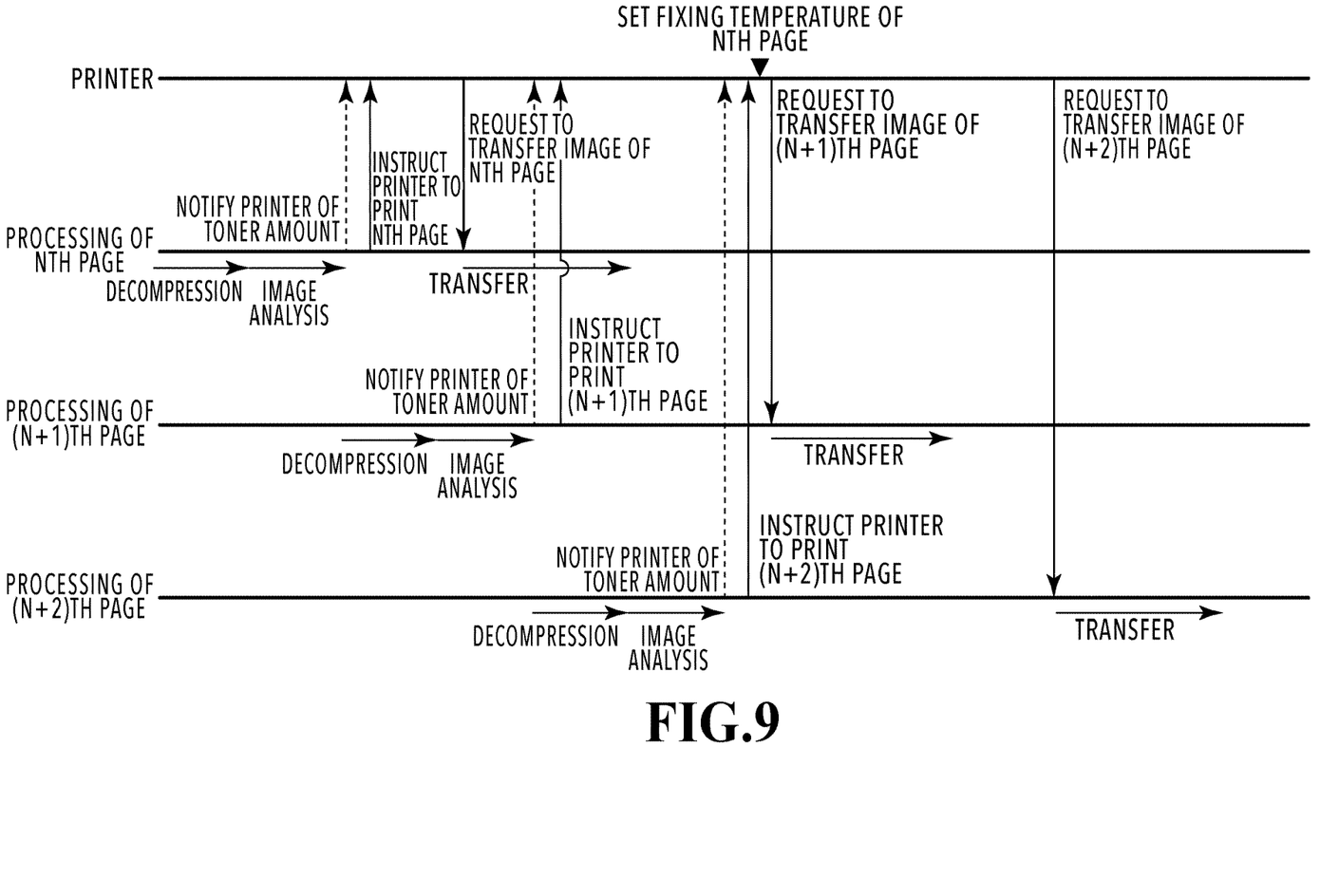
FIG. 9 is a timing chart showing progress of image analysis and image transfer according to a first embodiment.
Figure 10:
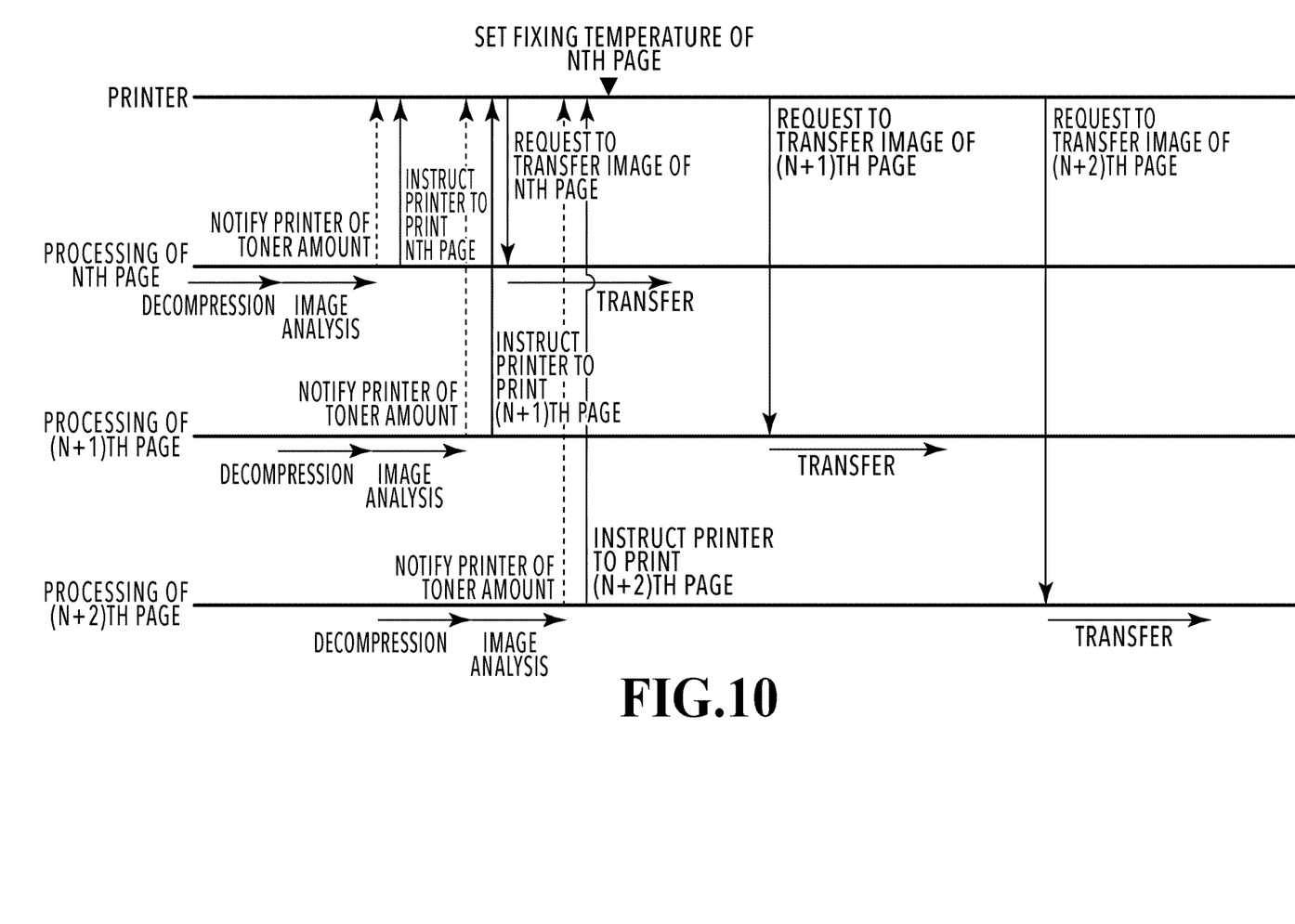
FIG. 10 is a timing chart showing progress of image analysis and image transfer according to a modification example of the first embodiment.

In the example in FIG. 9 described above, after the notification of the toner application amount for the Nth page (S706 in the flow in FIG. 7 described previously), the decompression processing of the compressed data of the (N+1)th page is started. Next, an aspect in which the degree of parallel is further increased is explained as a modification example of the present embodiment. FIG. 10 is a timing chart showing progress of image analysis and image transfer according to the present modification example. As shown in FIG. 10, in this modification example, in the stage of completion of the decompression processing of the compressed data of the Nth page, the decompression processing for the compressed data of the (N+1)th page is started. Then, in the stage of completion of the decompression processing of the compressed data of the (N+1)th page, the decompression processing for the compressed data of the (N+2)th page is started. That is, the image analysis for the Nth page and the decompression for the (N+1)th page are performed in parallel and the image analysis for the (N+1)th page and the decompression for the (N+2)th page are also performed in parallel. As a result of this, it is made possible to give a notification of the toner application amount of each page further earlier than in the case of FIG. 9, and therefore, it is made possible to set the fixing temperature for each page earlier. As a result of this, it is possible to implement a further increase in speed by a combination with a printer engine of higher performance and capable of high-speed operation.

As above, according to the present embodiment, a notification of the toner application amount is given immediately after image analysis without performing decompression processing separately for image analysis and for image transfer. Due to this, in an electrophotographic image forming apparatus, it is possible to appropriately control the fixing temperature while implementing an increase in speed due to improvement of the PPM. Further, the image analysis is performed for the image data after the page layout is changed in accordance with printing information, and therefore, it is made possible to perform control of the fixing temperature and the like based on an accurate image feature quantity.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in an electrophotographic image forming apparatus, it is possible to attain both an increase in speed due to improvement of the PPM and appropriate fixing process control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-121966, filed Jun. 27, 2018, which is hereby incorporated by reference wherein in its entirety.

What is claimed is:

1. An image forming apparatus comprising:
   a printer configured to perform printing processing by an electrophotographic method; and
   a controller having one or more processors which executes instructions stored in one or more memories, the controller being configured to control the printer, wherein the controller:
   decompresses compressed quantized raster image data in units of pages;
   derives an image feature quantity from decompressed raster image data in units of pages;
   notifies the printer of the derived image feature quantity; and
   transfers the decompressed raster image data to the printer in units of pages in response to an image transfer request from the printer, and the printer:
   sets a parameter relating to a fixing process in the printing processing based on the notified image feature quantity; and
   performs the printing processing in accordance with the set parameter for the decompressed raster image data received from the controller.

2. The image forming apparatus according to claim 1, wherein
   the controller performs derivation of the image feature quantity of a preceding page and the decompression of the next page of the preceding page in parallel in a case of performing the printing processing continuously for a plurality of pages.

3. The image forming apparatus according to claim 2, wherein
   the printer sets the parameter of the preceding page based on the image feature quantity of the preceding page and the image feature quantity of the following page thereof in a case of performing the printing processing continuously for a plurality of pages.

4. The image forming apparatus according to claim 1, wherein
   the image feature quantity is one of a toner application amount, a coverage, and an average print ratio.

5. The image forming apparatus according to claim 4, wherein
   the parameter relating to the fixing process is a fixing temperature, and
   the larger the toner application amount is, or the higher the coverage and the average print ratio are, the higher the fixing temperature the controller sets.

6. The image forming apparatus according to claim 4, wherein
   the parameter relating to the fixing process is an interval between sheets at a time of sheet conveyance, and
   the larger the toner application amount is, or the higher the coverage and the average print ratio are, the wider the interval between sheets the controller sets.

7. The image forming apparatus according to claim 1, comprising:
   an interface that receives target data of the printing processing from an external device, wherein
   the compressed raster image data is compressed raster image data received from the external device or data obtained by compressing raster image data generated by interpreting PDL data received from the external device.

8. The image forming apparatus according to claim 1, wherein
   the controller performs derivation of the image feature quantity after performing predetermined image processing for the decompressed raster image data.

9. The image forming apparatus according to claim 8, wherein
   the predetermined image processing is one of processing to rotate, move, or scale the decompressed raster image data in units of pages and processing to combine the decompressed raster image data of a plurality of pages.

10. A control method of an image forming apparatus comprising a printer configured to perform printing processing by an electrophotographic method and a controller configured to control the printer, the control method comprising, by the controller:
    decompressing compressed quantized raster image data in units of pages;
    deriving an image feature quantity from decompressed raster image data in units of pages;
    notifying the printer of the derived image feature quantity; and
    transferring the decompressed raster image data to the printer in units of pages in response to an image transfer request from the printer, wherein the method further comprises, by the printer:
    setting a parameter relating to a fixing process in the printing processing based on the notified image feature quantity; and
    performing the printing processing in accordance with the set parameter for the decompressed raster image data received from the controller.

11. A non-transitory computer readable storage medium storing a program for causing a computer to perform a control method of an image forming apparatus comprising a printer configured to perform printing processing by an electrophotographic method and a controller configured to control the printer, the control method comprising, by the-controller:
    decompressing compressed quantized raster image data in units of pages;
    deriving an image feature quantity from decompressed raster image data in units of pages;
    notifying the printer of the derived image feature quantity; and
    transferring the decompressed raster image data to the printer in units of pages in response to an image transfer request from the printer, wherein the method further comprises, by the printer;
    setting a parameter relating to a fixing process in the printing processing based on the notified image feature quantity; and performing the printing processing in accordance with the set parameter for the decompressed raster image data received from the controller.

12. A control method of an image forming apparatus having a memory for storing decompressed data, comprising:
- decompressing compressed quantized raster image data in units of pages;
- storing the decompressed raster image data in the memory;
- deriving an image feature quantity in units of pages based on the decompressed raster image data stored in the memory;
- setting a parameter relating to a fixing process in printing processing based on the derived image feature quantity; and
- performing, in accordance with the set parameter, the printing processing of the decompressed raster image data in units of pages stored in the memory.

13. The control method of the image forming apparatus according to claim 12, wherein
- a memory for storing the decompressed data used for the printing processing and a memory for storing the decompressed data used for deriving the image feature quantity are a same memory.

* * * * *